United States Patent
McClure et al.

(10) Patent No.: US 8,561,944 B2
(45) Date of Patent: Oct. 22, 2013

(54) SYSTEM AND METHOD FOR DESATURATION OF A CONTROL MOMENT GYROSCOPE

(75) Inventors: Paul D. McClure, Fort Worth, TX (US); Kenneth M. Dorsett, Aledo, TX (US)

(73) Assignee: Lockheed Martin Corporation, Bethesda, MD (US)

(*) Notice: Subject to any disclaimer, the term of this patent is extended or adjusted under 35 U.S.C. 154(b) by 289 days.

(21) Appl. No.: 12/817,941

(22) Filed: Jun. 17, 2010

(65) Prior Publication Data

US 2011/0309191 A1 Dec. 22, 2011

(51) Int. Cl.
*B64C 17/06* (2006.01)
(52) U.S. Cl.
USPC ............................................. 244/79; 702/104
(58) Field of Classification Search
USPC ........... 244/79, 75.1, 177, 164, 165; 702/104, 702/106, 85, 87, 92, 144, 150
See application file for complete search history.

(56) References Cited

U.S. PATENT DOCUMENTS

| 5,312,073 | A | 5/1994 | Flament |
| 5,681,012 | A | 10/1997 | Rosmann |
| 5,996,942 | A * | 12/1999 | Price et al. ................... 244/168 |
| 6,241,194 | B1 | 6/2001 | Heiberg |
| 6,729,580 | B2 * | 5/2004 | Shultz ............................. 244/79 |
| 6,990,396 | B2 * | 1/2006 | Wang et al. ..................... 701/13 |

OTHER PUBLICATIONS

Lim, K, "A Feasibility Study on the Control of a Generic Air Vehicle Using Control Moment Gyros," Nasa Technical Reports Srvice, Nasa Langely Research Center, Jan. 2006.

* cited by examiner

*Primary Examiner* — Timohy D Collins
*Assistant Examiner* — Brian M O'Hara
(74) *Attorney, Agent, or Firm* — Bracewell & Giuliani LLP

(57) ABSTRACT

A method of de-saturating a control moment gyroscope that leverages a torque on an aircraft that is generated by airflow over the aircraft. As an aircraft navigates through an airspace, the aircraft may destabilize and reorient to form a sideslip angle that forms the airflow torque on the aircraft. The control moment gyroscope may be de-saturated into a neutral position that in turn exerts a torque on the aircraft that counters the airflow torque. A scissor pair of first and second control moment gyroscopes can be used for generating a torque in a single plane.

16 Claims, 6 Drawing Sheets

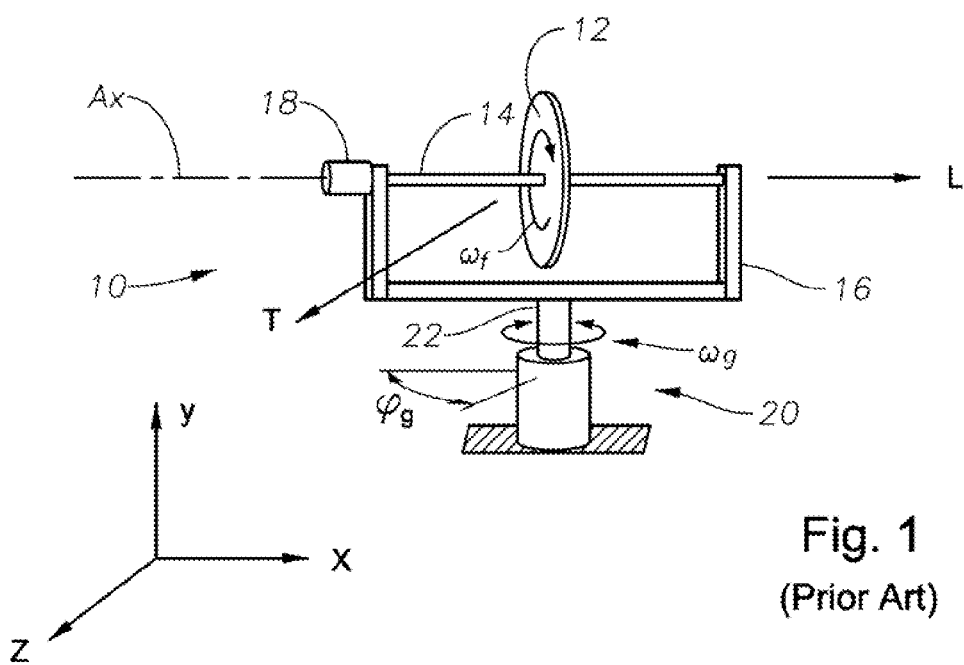
Fig. 1
(Prior Art)
Fig. 2
(Prior Art)
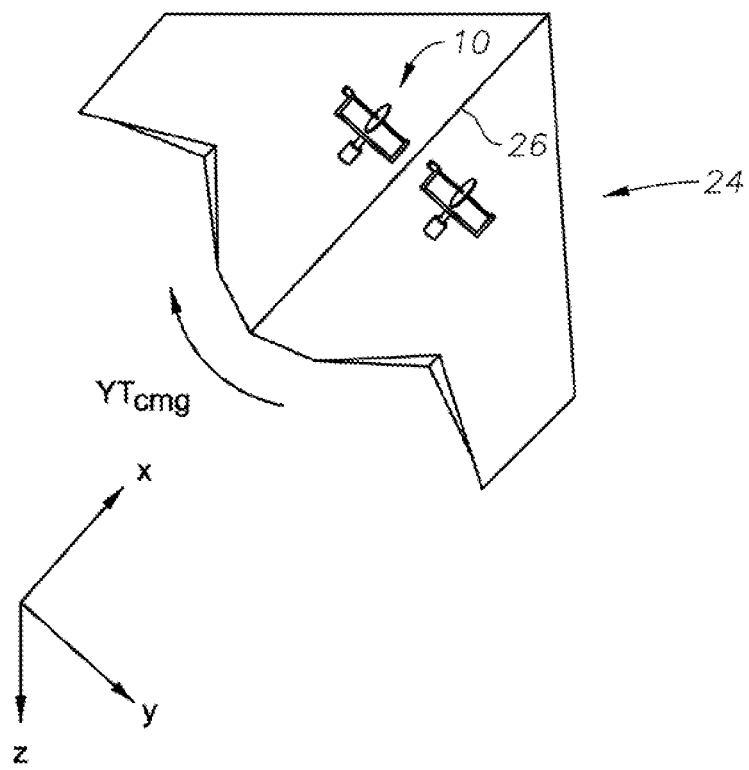

US 8,561,944 B2

SYSTEM AND METHOD FOR DESATURATION OF A CONTROL MOMENT GYROSCOPE

BACKGROUND

1. Field of Invention

The present disclosure relates generally to a system and a method for de-saturating a control moment gyroscope used for applying a control moment to an aircraft or other vehicle. More specifically, the present disclosure relates to a system and method of de-saturating a control moment gyroscope that leverages an aerodynamic moment created when the aircraft is subjected to a flow angle.

2. Description of Prior Art

Control moment gyroscopes (CMG) are typically used for controlling attitude of spacecraft. Using a CMG, a torque can be generated within and imparted onto the spacecraft via an exchange of angular momentum. A CMG may be defined as a way to exchange angular momentum from a flywheel spinning at a constant rate, that is converted to torque by pivoting or gimballing the flywheel about an axis transverse to the spinning flywheel, that then is applied to the vehicle of interest via rigid mounting of the CMG system to the structure of the vehicle. The output torque of the CMG typically orients orthogonal to both the flywheel axis and the gimbal axis by gyroscopic precession. As an example, a prior art CMG assembly is shown in a side perspective view in FIG. 1. The CMG assembly 10 includes a rotating flywheel 12 mounted coaxially about an axis 14. The axis 14 is secured within a U-shaped yoke 16 having a lower frame portion set apart from the outer diameter of the flywheel 12. Attached on an end of the yoke 16 is a flywheel motor 18 that is coupled to the axle 14; operating the motor 18 rotates the axle 14 for delivering rotational motion to the flywheel 12.

A torque T may be generated by first spinning the flywheel 12 and then pivoting the flywheel 12 about an axis transverse to the axle 14. A gimbal motor 20 with attached gimbal shaft 22 is shown for pivoting the yoke 16 and flywheel 12. Rotating the flywheel 12 shown at an angular velocity of $\omega_f$, generates an angular momentum vector L. In the example of FIG. 1, the angular momentum vector L is equal to the moment of inertia (I) of the rotating flywheel 12 multiplied by the angular velocity $\omega_f$ of the flywheel 12. Pivoting the flywheel 12 by rotating the shaft 22, at a gimbal rate represented by the angular velocity $\omega_g$, changing the gimbal angle φg of the shaft 22, produces a torque T: where the magnitude of torque T may be represented by $(I)(\omega_g)(\omega_f)$. The torque T is oriented orthogonal to the axis $A_x$ of the flywheel 12. The direction of the torque T remains orthogonal to the axis $A_x$, and therefore changes orientation as the flywheel 12 is pivoted by the gimbal motor 20.

FIG. 2 schematically illustrates a prior art "scissor pair" of CMG assemblies 10 shown oppositely oriented and anchored within an aircraft 24. The scissor pair CMG generate a pure output torque about the yaw or Z-body axis, as in the example shown in FIG. 2. In this arrangement, the flywheels 12 of the CMG assemblies 10 are aligned so that when in a neutral position the flywheels 12 and their angular momentum vectors are substantially coaxial but cancel one another. As the aircraft maneuvers and/or the gimbal angles of the individual CMG assemblies become non-zero, each assembly will generate torques about the X and Y aircraft body axes. However, since the flywheels 12 for each CMG assembly 10 are positioned such that their angular momentum vectors face in opposite directions, these undesired off-axis torques cancel one another so long as the gimbal angles and rates of each individual assembly are of equal magnitude. Thus, when the scissor pair CMG assemblies are pivoted at the same gimbal rate, but in opposite angular directions, each CMG assembly 10 generates additive torque components along the Z-axis: where $\phi_g$ is defined as zero in the starting point shown in FIG. 2; both flywheel momentum vectors, L, lie in x-y plane at $\phi_g$ equal to zero.

The output torque in the z-direction, Tz, from the scissor pair assembly is a function of the cosine of the commanded gimbal angle $\phi_g$; $Tz=(I)(\omega_g)(\omega_f)\cos(\phi_g)$. For the purposes of discussion herein, a neutral position for the flywheel 12 is an initial orientation with $\phi_g=0$. As such, the CMG assemblies 10 of FIG. 2 "saturate" after 90° of pivot from the neutral position and will no longer impart a torque along the Z-axis. Therefore, the CMG assemblies can be de-saturated by commanding the gimbal angles back towards neutral. Gimbal de-saturation commands will generate additional output torque on the vehicle that is undesired and requires balancing by an external torque on the vehicle such that the gimbal angles can be commanded towards neutral with no resultant dynamic response on the vehicle.

SUMMARY OF INVENTION

Disclosed herein is a method of providing de-saturation control for a control moment gyroscope being used to control a vehicle, such as an aircraft. Gimbal position feedback from the CMG can be summed with the command and vehicle state feedbacks resulting in a small state variable command being sent to the CMG control. This may result in the command of a small external aerodynamic torque via natural aerodynamic stability of the vehicle that the CMG can react against, thus providing the means to move back towards a neutral position. In an example embodiment, the CMG is being used to control the directional axis of an aircraft. The gimbal position may be summed with the yaw command and state variable feedbacks within the control loop. When gimbal position is non-zero, the gimbal feedback may result in a small sideslip command being sent through the CMG in a direction such that the CMG can re-orient to the neutral position. The present method can be practiced without deflections of aerodynamic control surfaces. The sideslip command can generate an aerodynamic torque via the natural bare airframe stability characteristics of the vehicle such that the CMG output torque can be balanced during re-orientation to neutral.

In an example of use of the disclosed method, the control moment gyroscope is used in a scissor pair configuration to generate pure torque about the yaw axis. An alternative of the method may be used for control in the pitch or roll axes as well so long as there are aerodynamic torques available in those axes through the basic aerodynamic stability of the vehicle. The method may be used with alternative CMG topographies such as a 4-CMG pyramid arrangement. An alternative of the method may be used to control any vehicle moving through a fluid such as a ship, submarine, submersible, airship, rotary winged aircraft or other type of aircraft.

In an example embodiment, disclosed herein is a method of operating a control moment gyroscope for controlling a vehicle, such as an aircraft. In one example the method includes navigating an aircraft, where the aircraft has an on board control moment gyroscope that is offset from a neutral position. When the aircraft is orientated so that a torque is generated onto the aircraft, the gyroscope is de-saturated by positioning the control moment gyroscope into the neutral position. This in turn exerts a control moment to the aircraft that is substantially opposite the generated torque and maintains the aircraft substantially in the torque generating orientation. The method can also include monitoring aircraft orientation and determining if positioning the control moment gyroscope into the neutral position can exert a control moment to the aircraft to maintain the aircraft substantially in the torque generating orientation. Example control moments are a yaw control, a roll control, and a pitch control. In an example of use of the disclosed method, the control moment gyroscope is a scissor pair configuration. In an alternative, the aircraft can be self stabilizing, so that when the control moment exerted onto the aircraft by the control moment gyroscope is removed, the torque generated onto the aircraft reorients the aircraft to a stabilized position. In yet another alternative, feedback can be included that represents position of the control moment gyroscope to a control input for positioning the control moment gyroscope. Example feedback gain can be from about 0.2 to about 0.6 or can be about 0.33. In another alternative, the control moment gyroscope can be activated to put the aircraft in an orientation that generates a torque on the aircraft and then repeating the desaturation process.

Also disclosed is a method of controlling an aircraft that includes flying an aircraft that has on board a control moment gyroscope and moving the control moment gyroscope from an offset position into a neutral position. This can de-saturate the control moment gyroscope by producing a control moment in the aircraft that counters a torque generated in the aircraft by an orientation of the aircraft in flight. In an alternative, the control moment gyroscope can be moved or operated to place the aircraft into a torque generating orientation so that the step of de-saturating can take place. In an example embodiment, the control moment gyroscope can be a scissor pair configuration. An example embodiment includes monitoring the aircraft orientation and then repeating the de-saturating step. Control moments can include a yaw torque. Feedback representing the position of the control moment gyroscope can be sent to a control input for positioning the control moment gyroscope. An example of feedback gain can be about 0.33.

In another example embodiment, a method is disclosed for controlling an aircraft that includes providing a control moment gyroscope onboard the aircraft, and that when pivoted in a control direction, having the control moment gyroscope exert a control torque onto the aircraft. Additionally, when pivoted in a de-saturating and opposite direction, have the control moment gyroscope exert a de-saturating torque onto the aircraft that is opposite the control torque. A torque that is generated in a frame of the aircraft by a stream of air flowing over the aircraft can be identified and determine, wherein the air flow torque may be substantially opposite a de-saturating torque. In an example method, the control moment gyroscope can be pivoted in the de-saturating position and towards a neutral position while exerting a de-saturating torque that counters the torque generated by the stream of air or other fluid.

BRIEF DESCRIPTION OF DRAWINGS

Some of the features and benefits of the present invention having been stated, others will become apparent as the description proceeds when taken in conjunction with the accompanying drawings, in which:

FIG. 1 is a side perspective schematic view of a prior art control moment gyroscope assembly.

FIG. 2 is an overhead perspective view of an aircraft with a scissor pair CMG assembly.

Figure 3A:
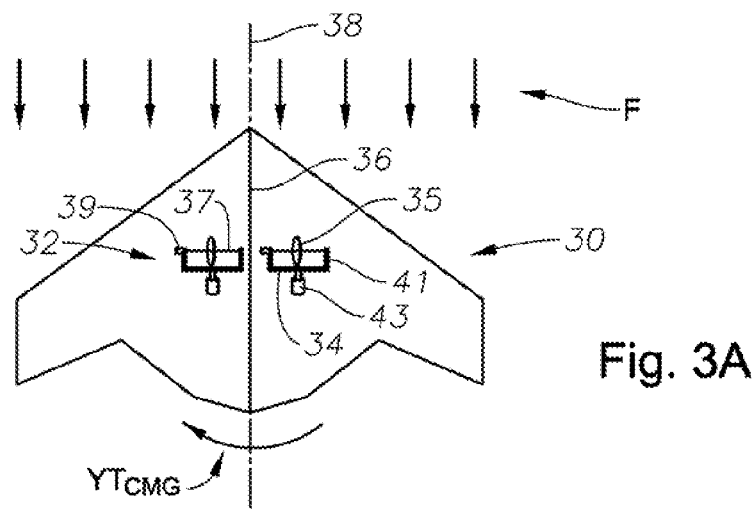
FIGS. 3A, 3B, and 3C are schematic views of aircraft control using a CMG assembly.

It will be understood the improvement described herein is not limited to the embodiments provided. On the contrary, the present disclosure is intended to cover all alternatives, modifications, and equivalents, as may be included within the spirit and scope of the improvement as defined by the appended claims.

DETAILED DESCRIPTION OF INVENTION

The improvement(s) of the present disclosure will now be described more fully hereinafter with reference to the accompanying drawings in which disclosed embodiments are shown. The disclosed improvement(s) may, however, be embodied in many different forms and should not be construed as limited to the illustrated embodiments set forth herein; rather, these embodiments are provided so that this disclosure will be thorough and complete, and will fully convey the scope of the disclosure to those skilled in the art. Like numbers refer to like elements throughout.

It is to be understood that the improvement(s) described herein is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, applicants' improvement(s) is therefore to be limited only by the scope of the appended claims.

An aircraft 30 is shown in schematic form in FIG. 3A that is in flight and in a flow stream F. The aircraft 30 has a flight control system that includes a CMG system 32. In the example of FIG. 3A, the CMG system 32 includes a pair of CMGs 34 in a scissor-type arrangement. Each CMG 34 is shown having a flywheel 35 mounted on an axle 37 rotatable by a flywheel motor 39. The axle 37 is mounted in a frame 41 gimbaled or pivoted by a gimbal motor 43. However, alternative embodiments of the aircraft 30 may include a single CMG or more than two CMGs. The aircraft 30 includes a center line 36 wherein the center line 36 is aligned with a flight path 38 on which the aircraft 30 is shown navigating. In the example of FIG. 3A, the CMG system 32 creates a yaw torque $YT_{CMG}$ onto the aircraft 30 disposed transverse to the flight path 38. The torque can be generated through gimbal rate commands applied to the CMG gimbal motors 43; the CMG providing control torques each time the gimbal motor moves at rate $\omega_g$. The yaw torque $YT_{CMG}$ may be applied for redirecting the aircraft 30 thereby adjusting the flight path 38, or reorienting the aircraft 30 relative to the flight path 38.

Figure 3B:
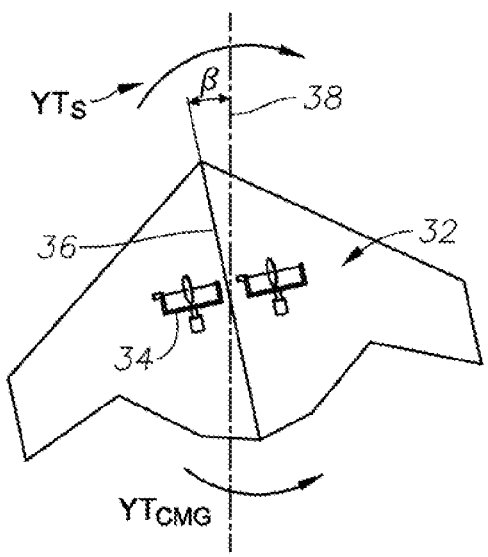

Shown schematically represented in FIG. 3B, the aircraft 30 is orientated with the center line 36 at a sideslip angle β offset from the flight path 38. The aircraft 30 may be in the offset position FIG. 3B due to a discontinuity in the flow path F, such as air turbulence, or by exerting a yaw torque $YT_{CMG}$ onto the aircraft 30 from the CMG system 32. In embodiments when the aircraft 30 is self stabilizing, a restoring aerodynamic moment $YT_S$ is generated on the frame of the aircraft 30 by airflow over the frame. The aerodynamic moment $YT_S$ is directed to realign the aircraft 30 so that the center line 36 substantially coincides with the flight path 38 and the angle β approaches zero. In embodiments where the aircraft 30 is unstable about the yaw axis, the aerodynamic moment $YT_S$ can be used to increase the angle of sideslip β. Assuming the yaw torque $YT_{CMG}$ created by the CMG system 32 of FIG. 3A pivots the flywheels 35 of the CMGs 38 from a neutral towards a saturated position, an oppositely directed yaw couple $YT_{CMG}$ could then be generated by pivoting the flywheels 35 of the CMGs 34 of FIG. 3B towards a neutral and thus de-saturated position. The oppositely directed torque created when returning the CMG to neutral requires a reactive torque. Thus, in an example embodiment, the aerodynamic moment created by the natural airframe stability (either stable or unstable) can be used to offset the torque generated by the CMG system as it returns to neutral.

Figure 3C:
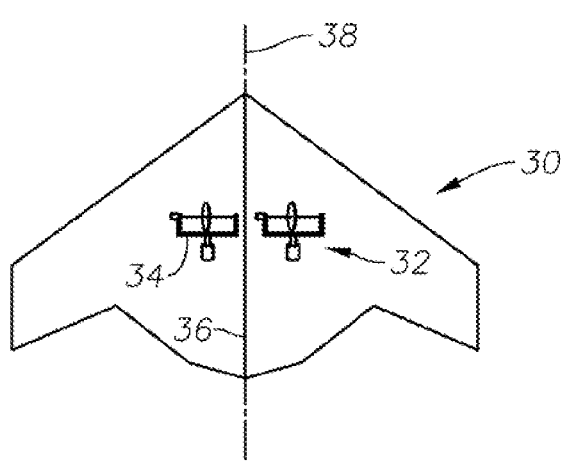

In the example of FIG. 3B, the angular gimbal rate by which the CMGs 34 are pivoted may be regulated so that the yaw torque $YT_{CMG}$ has substantially the same magnitude of the yaw torque $YT_S$. In this example, the slip stream angle β is maintained between the central line 36 and flow path 38 as the flywheels 35 of the CMGs 34 are repositioned into a neutral and de-saturated position. The gimbal motors 43 may be deactivated when the CMGs 34 reach the neutral de-saturated position, thereby removing the control yaw torque $YT_{CMG}$. In the example of FIG. 3C, the aircraft 30 has returned to the zero sideslip condition, and the CMG system 32 is back in the neutral de-saturated position wherein the centerline 36 is substantially coaxial with the flight path 38 and the CMG gimbal angles are zero.

In an exemplary embodiment, the flywheels 35 of the CMGs 34 are pivoted, in a saturating direction, to control the aircraft 30. Pivoting the CMGs 34 generates a first yaw torque on the aircraft 30 to orient the centerline 36 left of flight path 38. In an optional embodiment, the CMG system 32 can then be controlled to intentionally generate a second yaw torque to orient the aircraft such that the centerline 36 is directed yet further left of the centerline 38. In another optional embodiment, the pivot direction of the flywheels 35 of the CMGs 34 can be reversed to gimbal the flywheels 35 towards a neutral position thereby imparting a third yaw torque onto the aircraft. In this example, the third yaw torque is directed opposite the second yaw torque and creates a nose right orientation to the aircraft 30. By adjusting and controlling the rate and direction by which the flywheels 35 are gimbaled, the aircraft 30 can be reoriented to align the centerline 36 with the flight path 38 while de-saturating the CMGs 34.

Figure 4A:
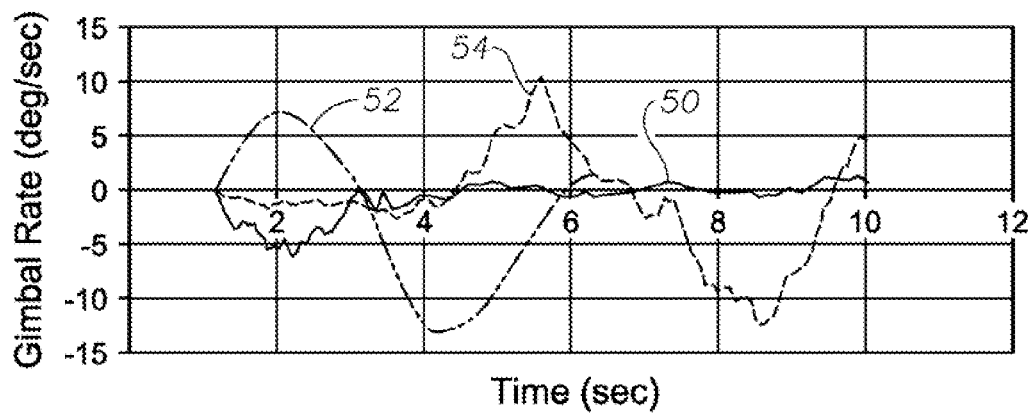
FIGS. 4A and 4B are graphic simulation time history representations of example gimbal rate and gimbal position for various in-flight maneuvers.
Figure 4B:
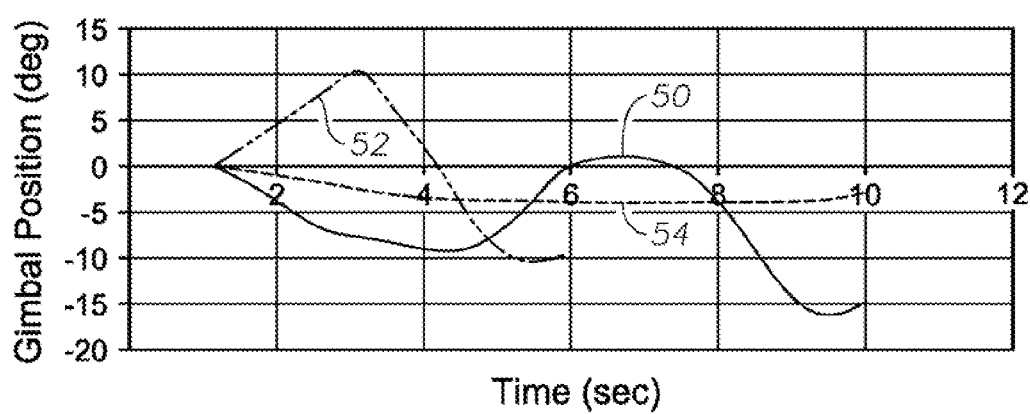

Graphically illustrated in FIGS. 4A and 4B are time history plots of gimbal rate in degrees per second and gimbal position in degrees for maneuvers at three different flight conditions. The CMG system used in this control time history example is a scissor pair controlling the yaw axis of the aircraft. The aircraft in this example case is statically unstable about the yaw axis and requires continuous closed-loop control to remain dynamically stable during flight. The CMG system is the only controller providing closed-loop control moments in this example. The plots represent a powered approach landing condition in turbulence 50, a roll maneuver during the landing condition 52, and high-speed cruise flight in turbulence 54. In an example embodiment, turbulence and/or roll maneuvers generate sideslip upsets that can be augmented by the CMG system operating in a closed-loop flight control system so the aircraft can remain in controlled flight. As can be seen from the example plots 50, 52, 54, maximum gimbal rates correspond to large changes in gimbal position. In the example represented in FIGS. 4A and 4B, the flywheel gimbal position is left in a non-zero condition at the end of each maneuver time history; that can reduce CMG control capacity due to proximity to the saturation point. De-saturating the CMG returns the gimbal angle to a neutral position and ensures the CMG system can generate maximum torque.

Figure 5:
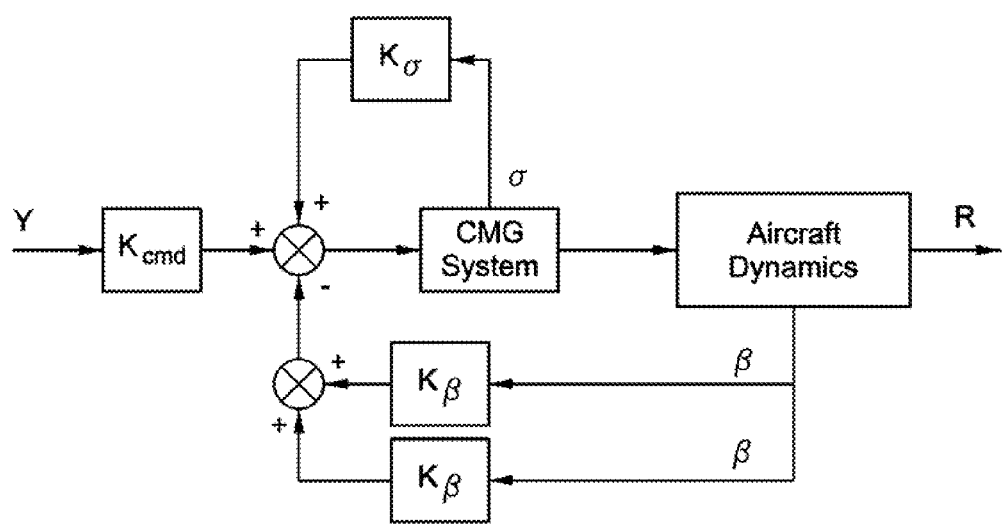
FIG. 5 is a control block diagram schematic of an example aircraft control system utilizing a CMG for control.

An example of a control block diagram for controlling an aircraft is schematically illustrated in FIG. 5 wherein the aircraft dynamics are being controlled by a CMG system. In this example an input control command, represented as Y, is directed to the CMG gimbal actuation motor 43. The output of the CMG system 32 provides control torques to the aircraft. The CMG gimbal position is fed back through a gain $K_o$ and is summed to the input command. State feedback values of sideslip angle β and rate of change of the slideslip angle β-dot are subtracted from the input control command Y in order to provide closed-loop augmentation of the aircraft dynamics through appropriately selected gains $K_β$ and $K_{β\text{-}dot}$. The resultant output dynamics of the system are represented by the response R.

Figure 6A:
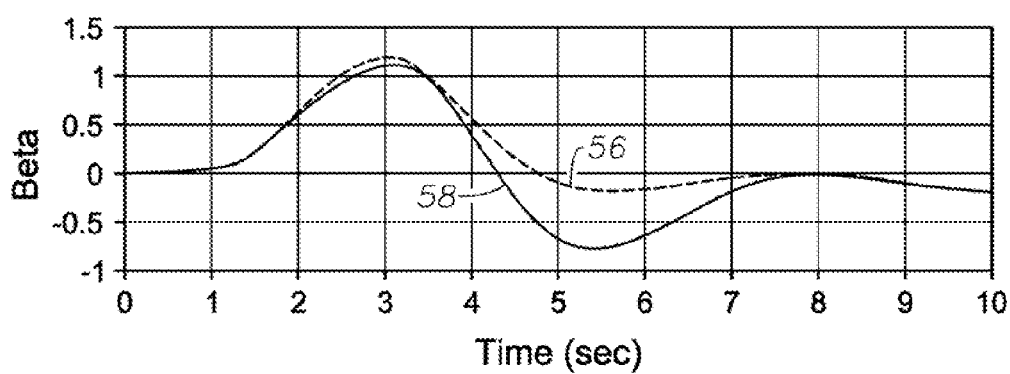
FIGS. 6A and 6B are graphic representations of simulation time histories showing gimbal angles and sideslip angles for different gimbal position feedback gain values.
Figure 6B:
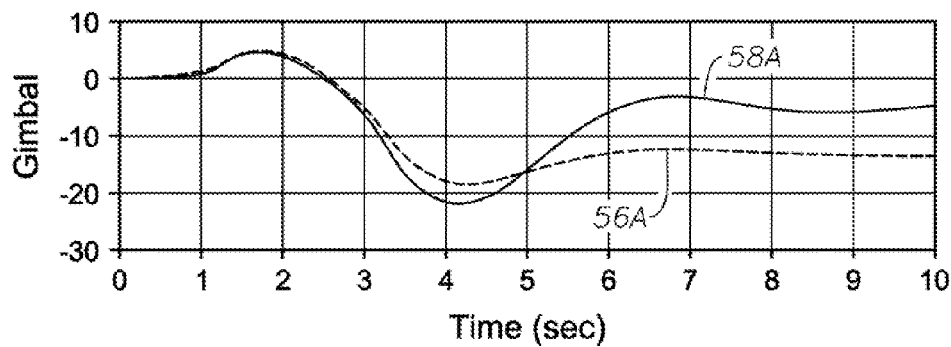

Referring now to FIG. 6A, shown is a graphical representation of a time history of side slip angle β that includes a plot 56 representing gimbal position feedback gain ($K_o$) of zero and a plot 58 representing a gimbal position feedback gain of 0.33. FIG. 6B graphically represents the time history of gimbal position and includes a plot 56A representing gimbal position feedback gain ($K_o$) of zero and a plot 58A representing a gimbal position feedback gain of 0.33. In the zero feedback gain plot 56A, the maneuver is completed with the CMG gimbal position resting at a non-zero position of approximately −12 degrees. Sideslip is well controlled with good frequency and closed-loop damping characteristics (FIG. 6A) but the final gimbal angle is non-zero. As illustrated by plot 58A, in the example of the feedback gain being 0.33, the CMG system 32 is continuously controlled to gimbal towards a neutral position. At the end of the time history, gimbal position is approximately −5.0 degrees and trending towards zero (FIG. 6B). The magnitude of the sideslip angle response β is shown as being slightly greater than the zero gimbal feedback case as the external aerodynamics of the aircraft balance the torque of gimballing flywheels of flight control CMGs towards zero. The non-zero gimbal position feedback gain results in closed loop dynamics that are acceptable. The plots of FIGS. 6A and 6B were generated by inputting a square wave doublet command (Y) through the block diagram example of FIG. 5.

Figure 7:
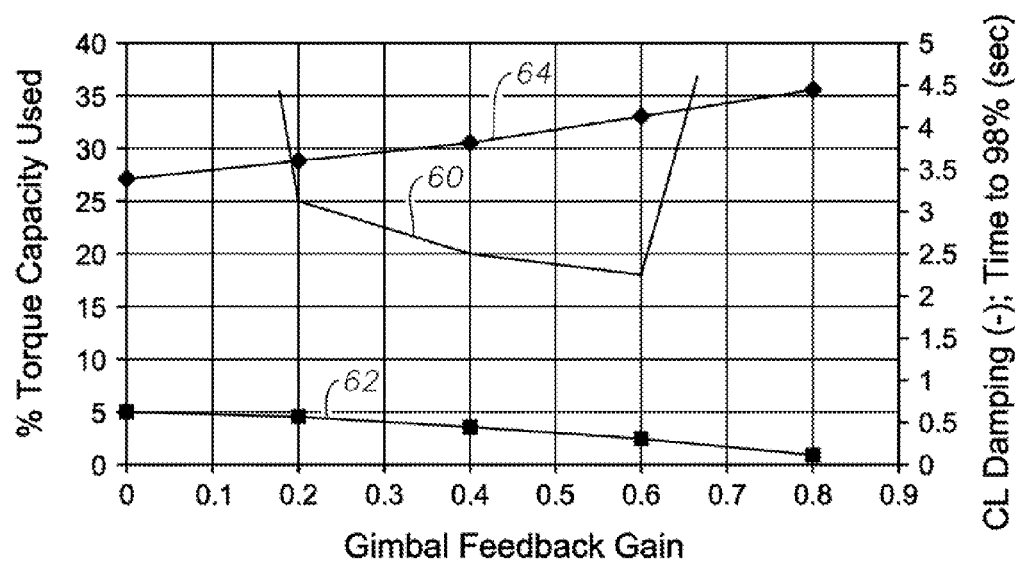
FIG. 7 is a graphical illustration of the effect of an example gimbal position feedback.

FIG. 7 graphically presents an example of time to de-saturate the CMG system, closed loop damping, and peak control torque. Plot 60 represents time to de-saturate, plot 62 represents closed loop damping, and plot 64 represents peak control torque. Plots 60, 62, 64 are plotted with respect to increasing gimbal position feedback gain. As shown, the closed loop damping slightly decreases with increasing gimbal feedback gain, whereas the percent of peak control torque increases over this range. The time required to de-saturate the CMG approaches infinity at values of gimbal feedback gain less than 0.2 and at values greater than 0.6 gimbal feedback gain. FIG. 7 illustrates an example of an operating envelope of CMG operation. More specifically, as shown in the example of FIG. 7, CMG de-saturation can be achieved for a range of gimbal position feedback gains between $0.2<K_o<0.6$.

Figure 8:
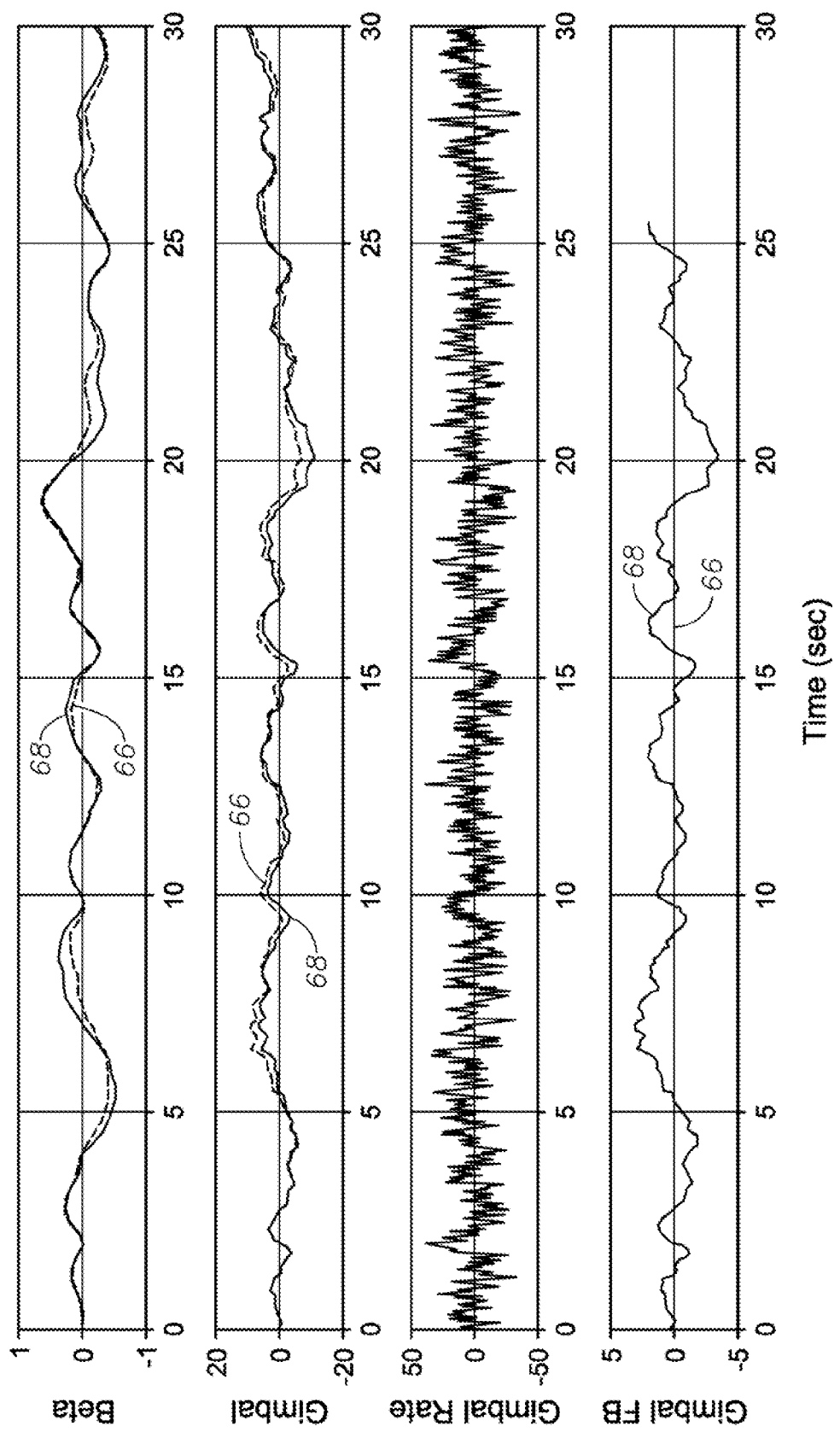
FIG. 8 is a graphical example of gimbal feedback, rate, angle, and beta angle over time.

Graphically represented in FIG. 8, a time history response of an aircraft to moderate levels of turbulence at a typical cruise flight condition. Plot 66 illustrates side slip angle, gimbal, gimbal rate, and gimbal feedback for a gimbal position feedback with zero gain. Plot 68 illustrates these values for a gain of 0.33. The plotted responses to turbulence are nearly identical for both feedback cases, slightly larger sideslip magnitudes however are seen in plot 68 for the 0.33 feedback case. This illustrates utilizing the externally applied aerodynamic moments on the aircraft frame by which to exert a countering torque for continuously de-saturating a CMG system. FIG. 8 also demonstrates the ability of the CMG to control the closed-loop system in the presence of atmospheric disturbances with the gimbal position feedback continually working to de-saturate the CMG.

It should be pointed out that the present disclosure is not limited to de-saturate control moment gyroscopes disposed to control the directional axis within aircraft. Other applications that exist include hybrid aircraft, short takeoff and vertical landing aircraft, low speed/high altitude aircraft, dirigibles, blimps, watercraft, submarines, submersibles, missiles, torpedoes, land vehicles, and any movable device that is or may be controlled, directionally or otherwise, with control moment gyroscopes.

The present system and method described herein, therefore, is well adapted to carry out the objects and attain the ends and advantages mentioned, as well as others inherent therein. While a presently preferred embodiment has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method of controlling an aircraft having a natural airframe stability comprising:
    (a) exerting a torque onto the aircraft with a control moment gyroscope;
    (b) gimbaling the control moment gyroscope to put the aircraft in an orientation that generates an aerodynamic moment onto the aircraft from a flow stream interacting with the natural airframe stability of the aircraft;
    (c) de-saturating the control moment gyroscope by gimbaling the control moment gyroscope in a direction that offsets the aerodynamic moment.

2. The method of claim 1, further comprising, monitoring orientation of the aircraft relative to the flowstream and determining if positioning the control moment gyroscope into the neutral position can exert a control moment to the aircraft.

3. The method of claim 1, further comprising monitoring orientation of the control moment gyroscope.

4. The method of claim 1, wherein the gimbaling of step (b) comprises a control selected from the group consisting of yaw control, roll control, pitch control, and combinations thereof.

5. The method of claim 1, wherein the step of de-saturating the control moment gyroscope is performed without deflecting an aerodynamic control surface.

6. The method of claim 1, wherein the control moment comprises a aerodynamic moment created by the flow stream interacting with the natural airframe stability of the aircraft is created because the aircraft is unstable.

7. The method of claim 1, wherein the control moment gyroscope is a first control moment gyroscope and the method further comprises controlling the aircraft with a second control moment gyroscope.

8. The method of claim 1, wherein the aircraft is self-stabilizing, so that when the control moment exerted onto the aircraft by the control moment gyroscope is removed, an externally applied aerodynamic moment applied onto the aircraft reorients the aircraft to a stabilized position.

9. The method of claim 1, further comprising providing feedback representing position of the control moment gyroscope to a control input for positioning the control moment gyroscope, wherein the feedback has a gain of from about 0.2 to about 0.6.

10. The method of claim 1, further comprising providing feedback representing position of the control moment gyroscope to a control input for positioning the control moment gyroscope, wherein the feedback has a gain of about 0.33.

11. The method of claim 1, further comprising controlling the aircraft by gimbaling the control moment gyroscope.

12. A method of operating an aircraft that has a natural bare airframe stability comprising:
    (a) moving the aircraft through a fluid so that an aerodynamic torque is generated on the aircraft via a natural airframe stability characteristic of the vehicle;
    (b) positioning a control moment gyroscope to put the aircraft in an orientation that generates the aerodynamic torque;
    (c) balancing the aerodynamic torque by gimbaling a control moment gyroscope in a direction that de-saturates the control moment gyroscope.

13. The method of claim 12, wherein the control moment gyroscope is a first control moment gyroscope and the method further comprises navigating the aircraft with a second control moment gyroscope that is in a scissor pair configuration with the first control moment gyroscope.

14. The method of claim 12, further comprising monitoring the orientation of the aircraft, and repeating step (c).

15. The method of claim 12, wherein the balancing of step (c) comprises exerting a torque selected from the group consisting of a yaw torque, a roll torque, a pitch torque, and combinations thereof.

16. The method of claim 12, further comprising providing feedback representing position of the control moment gyroscope to a control input for positioning the control moment gyroscope, wherein the feedback has a gain of about 0.33.

* * * * *